(12) United States Patent
Leyko et al.

(10) Patent No.: US 11,047,254 B2
(45) Date of Patent: Jun. 29, 2021

(54) FLOW DEFLECTOR FOR A DISCHARGE VALVE SYSTEM, DISCHARGE VALVE SYSTEM AND TURBOMACHINE COMPRISING SUCH A DISCHARGE VALVE SYSTEM

(71) Applicant: SAFRAN AIRCRAFT ENGINES, Paris (FR)

(72) Inventors: Matthieu Leyko, Moissy-Cramayel (FR); Julien Antoine Henri Jean Szydlowski, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 188 days.

(21) Appl. No.: 16/336,624

(22) PCT Filed: Sep. 26, 2017

(86) PCT No.: PCT/FR2017/052589
§ 371 (c)(1),
(2) Date: Mar. 26, 2019

(87) PCT Pub. No.: WO2018/060588
PCT Pub. Date: Apr. 5, 2018

(65) Prior Publication Data
US 2020/0378313 A1 Dec. 3, 2020

(30) Foreign Application Priority Data
Sep. 30, 2016 (FR) ........................ 1659475

(51) Int. Cl.
*F01D 17/10* (2006.01)
*F02K 3/075* (2006.01)
(Continued)

(52) U.S. Cl.
CPC .............. *F01D 17/105* (2013.01); *F02C 6/06* (2013.01); *F02K 3/02* (2013.01); *F02K 3/075* (2013.01);
(Continued)

(58) Field of Classification Search
CPC ... F02C 6/06; F02K 3/075; F02K 3/02; F01D 17/105
See application file for complete search history.

(56) References Cited

U.S. PATENT DOCUMENTS

| | | | | | |
|---|---|---|---|---|---|
| 4,537,277 | A | * | 8/1985 | Bryce ....................... | F02K 1/34 |
| | | | | | 181/214 |
| 2001/0042368 | A1 | * | 11/2001 | Negulescu ................ | F02C 9/18 |
| | | | | | 60/785 |

(Continued)

FOREIGN PATENT DOCUMENTS

| | | |
|---|---|---|
| EP | 2062688 A2 | 5/2009 |
| EP | 2891769 A1 | 7/2015 |

OTHER PUBLICATIONS

International Search Report dated Dec. 22, 2017, issued in corresponding International Application No. PCT/FR2017/052589, filed Sep. 26, 2017, 2 pages.

(Continued)

*Primary Examiner* — Ted Kim
(74) *Attorney, Agent, or Firm* — Christensen O'Connor Johnson Kindness PLLC

(57) ABSTRACT

The disclosure relates to a flow deflector for a discharge valve system of a double flow turbomachine compressor. The flow deflector comprises a wall provided with a plurality of ejection channels positioned to discharge a discharge air flow. The ejection channels are arranged in rows along aligned directions, substantially parallel to an axial plane of the deflector. The ejection channels of each row are oriented at a defined angle between a normal line to the wall and axes (Continued)

of the ejection channels, and decreasing between an upstream edge and a downstream edge of the wall, as defined according to the direction of movement of the air flow.

12 Claims, 4 Drawing Sheets

(51) Int. Cl.
 *F02C 6/06* (2006.01)
 *F02K 3/02* (2006.01)
(52) U.S. Cl.
 CPC .. *F05D 2250/314* (2013.01); *F05D 2270/101* (2013.01)

(56) References Cited

U.S. PATENT DOCUMENTS

| | | |
|---|---|---|
| 2007/0086885 A1* | 4/2007 | Appleby ............... F04D 27/023 415/145 |
| 2009/0188257 A1 | 7/2009 | Kirby |
| 2010/0199633 A1 | 8/2010 | Martensson et al. |
| 2011/0146297 A1* | 6/2011 | Balandier ............. F01D 17/105 60/785 |
| 2018/0094535 A1* | 4/2018 | Leyko ....................... F02C 9/18 |

OTHER PUBLICATIONS

Written Opinion of the International Searching Authority dated Dec. 22, 2017, issued in corresponding International Application No. PCT/FR2017/052589, filed Sep. 26, 2017, 6 pages.

* cited by examiner

FLOW DEFLECTOR FOR A DISCHARGE VALVE SYSTEM, DISCHARGE VALVE SYSTEM AND TURBOMACHINE COMPRISING SUCH A DISCHARGE VALVE SYSTEM

FIELD OF THE INVENTION

The present invention relates to the field of turbomachine, in particular to double flow turbomachine for aircraft. It relates in particular to a discharge valve system making it possible to discharge a portion of the air flow passing through a compressor in a flowpath of the turbomachine. It also relates to a turbomachine comprising such a discharge valve system.

STATE OF THE ART

A double flow turbomachine generally comprises, from upstream to downstream, according to the direction of the gas flow inside the turbomachine, at least one compressor, a combustion chamber and a turbine forming a gas generator installed in an inner casing. A mobile fan is arranged upstream from the gas generator and inside an outer casing, which also comprises the inner casing. The air passing through the turbomachine is split into a primary flow, or hot air flow circulating inside the gas generator, and a secondary flow, or cold air flow circulating around the inner casing. The hot air flow is compressed by the compressor stages of the turbomachine before entering the combustion chamber. The combustion energy is recovered by the turbine stages that contribute to driving the compressor stages and the upstream mobile fan, and therefore to providing the thrust of the turbomachine. The cold flow also participates in providing the thrust of the turbomachine.

Turbomachines are also provided with one or more discharge valve systems, also known by the term "Handling Bleed Valve" (HBV), that make it possible for the recovery of part of the hot air flow compressed by the compressor and, in particular, by a high-pressure compressor, before discharging it in the cold air flow, with which it is mixed. The purpose of this discharge is to stabilise the operations of the compressor by limiting surge, rotating stall or flotter phenomena.

Documents US-A1-2010/199633, US-A1-2009/188257, EP-A1-2891769 and EP-A2-2062688 disclose various types of discharge valve systems comprising a flow deflector provided with a plurality of openings oriented in the same direction. These openings discharge the flow of hot air from the compressor, either in the direction of circulation of the cold air flow, or in the opposite direction of the cold air flow circulation. These arrangements make it possible to increase the incorporation of the hot air flow discharged into the cold air flow, to limit thermal stresses on nearby structures and/or components that have not been configured to withstand high temperatures.

However, these arrangements do not consider or have solutions that make it possible to limit the perturbations in the circulation of the cold air flow generated by the fan which travels up the operating line of the fan in a compression-flow field and impacts the functioning of the turbomachine.

Aim of the Invention

The present applicant has therefore provided, as an aim, a flow deflector of a compressor discharge valve system that makes it possible to limit the perturbation caused by the circulation of the cold air flow, while limiting the thermal stresses exerted on the environment of the flowpath wherein an air flow circulates.

Presentation of the Invention

This aim is achieved according to the invention with a flow deflector of a compressor discharge valve system of a double flow turbomachine, the flow deflector being arranged at least in part in a flowpath in which circulates an air flow and comprising a wall provided with a plurality of ejection channels capable of discharging a discharge air flow from the compressor in the flowpath of the turbomachine, the ejection channels being arranged in rows along aligned directions that are substantially parallel to an axial plane of the deflector, the ejection channels of each row being oriented at an angle defined between a normal line to the wall and the axes of the ejection channels, and decreasing between an upstream edge and a downstream edge of the wall defined along the direction of movement of the air flow, and at least the channels of at least one row situated in the proximity of the upstream edge being oriented such that the discharge flow is substantially flush with the wall of the deflector and along the movement direction of the air flow.

In particular, each angle varies by decreasing along the first direction of movement of the air flow.

According to one characteristic of the invention, at least one row located in the proximity of the downstream edge is provided with channels that are oriented so that the discharge flow is substantially parallel to the central axis of the deflector. In other words, the discharge air flow passing through the ejection channels is guided in a direction that is substantially transversal in the direction of the downstream flow direction.

This flow deflector resolves the abovementioned disadvantages. Indeed, this flow deflector makes it possible to discharge the discharge air flow of the compressor in a direction that is flush and almost barely miss the wall of the deflector in the upstream portion, so as not to disrupt the circulation of the air flow coming from the fan of the turbomachine. The downstream rows make it possible to discharge a discharge air flow along a direction that is almost vertical in order, on the one hand, to not burn the structures and/or components near the secondary flowpath, and on the other hand, to create a "fluid wall" that prevents the air flow coming from the fan from flattening the discharge air flow downstream from the fan against the walls of the secondary flowpath, wherein circulates the air flow of the fan.

According to one characteristic of the invention, the angle of the channels varies between 65° and 5°, between the upstream edge and the downstream edge. Therefore, the angles decrease progressively and the discharge air flow has a progressive straightening that is integrated in the air flow coming from the fan in the secondary flowpath without negatively impacting the performance of the fan, while also protecting the walls of the secondary flowpath from thermal stresses.

According to one characteristic of the invention, the ejection channels of each row are oriented at the same angle.

According to one characteristic of the invention, each ejection channel is oriented at an angle of between 10° and 60°.

According the one characteristic of the invention, each ejection channel has a constant circular section.

According to one characteristic of the invention, the wall of the flow deflector has a spherical shape.

In an advantageous but non-limiting manner, each ejection channel extends on either side of the wall and has a constant circular section so as to facilitate the manufacturing of the flow deflector and to make it possible for the three-dimensional arrangement of the channels in the wall.

According to another characteristic of the invention, the flow deflector comprises a cylindrical body, preferably but in a non-limiting manner, with a circular section, coupled to an air inlet and to the wall provided with ejection channels, the body defining a passage between the air inlet and the flow deflector.

In an advantageous but non-limiting manner, the number of rows of ejection channels is between 20 and 30.

In particular, the ejection channels occupy almost all of the surface of the wall of the flow detector.

According to another characteristic of the invention, the wall of the flow deflector comprises at least one first series of rows positioned upstream and of which the channel angles of two consecutive rows are identical and between 55° and 65°, and one second series of rows positioned downstream and comprising at least one row of channels, the angles of which are between 5° and 15°.

According also to another characteristic of the invention, the wall comprises an intermediate series of rows located between the first series and the second series, the angles of the channels of the rows of this intermediate series varying by an identical value between each row, such that the variation of the angles is progressive and linear.

In an advantageous but non-limiting manner, the angles of the channels of the rows of the intermediate series are between 3° and 8°.

The invention also relates to a discharge valve system of a double flow turbomachine, the system comprising:
a flow deflector having any one of the abovementioned characteristics,
a duct connected to the flow deflector and comprising a hot air inlet,
a regulation device, making it possible to regulate the passage of the discharge air flow between the hot air inlet of the duct and the flow deflector, and
an actuator acting on the regulation device such that the device occupies at least one first position wherein the hot air inlet is closed and a second position wherein the hot air inlet is released or open.

According to one characteristic of the invention, the regulation device can occupy an intermediate position between the first position and the second position.

The invention also relates to a double flow turbomachine comprising a primary flowpath wherein circulates a hot air flow and a secondary flowpath wherein circulates a cold air flow, the flowpaths being separated by an inter-flowpath casing, at least one discharge valve system having any one of the abovementioned characteristics being arranged in the inter-flowpath casing. Thus, the discharge flow passing through the ejection channels is guided along at least one direction oriented along the direction of air flow circulation, and along a direction that is substantially perpendicular to the direction of air flow circulation.

The orientation of each channel is formed of a radial component and an axial component, but generally, can comprise a reduced and constant tangential component or a component making it possible for a slight divergence of the discharge flow (5 to 10 degrees).

BRIEF DESCRIPTION OF THE FIGURES

The invention will be better understood, and other aims, details, characteristics and advantages of it will become clearer upon reading the following detailed explanatory description relating to the embodiments of the invention, provided as examples and not limited thereto, and with reference to the appended figures, wherein.

DESCRIPTION OF EMBODIMENTS OF THE INVENTION

Figure 1:
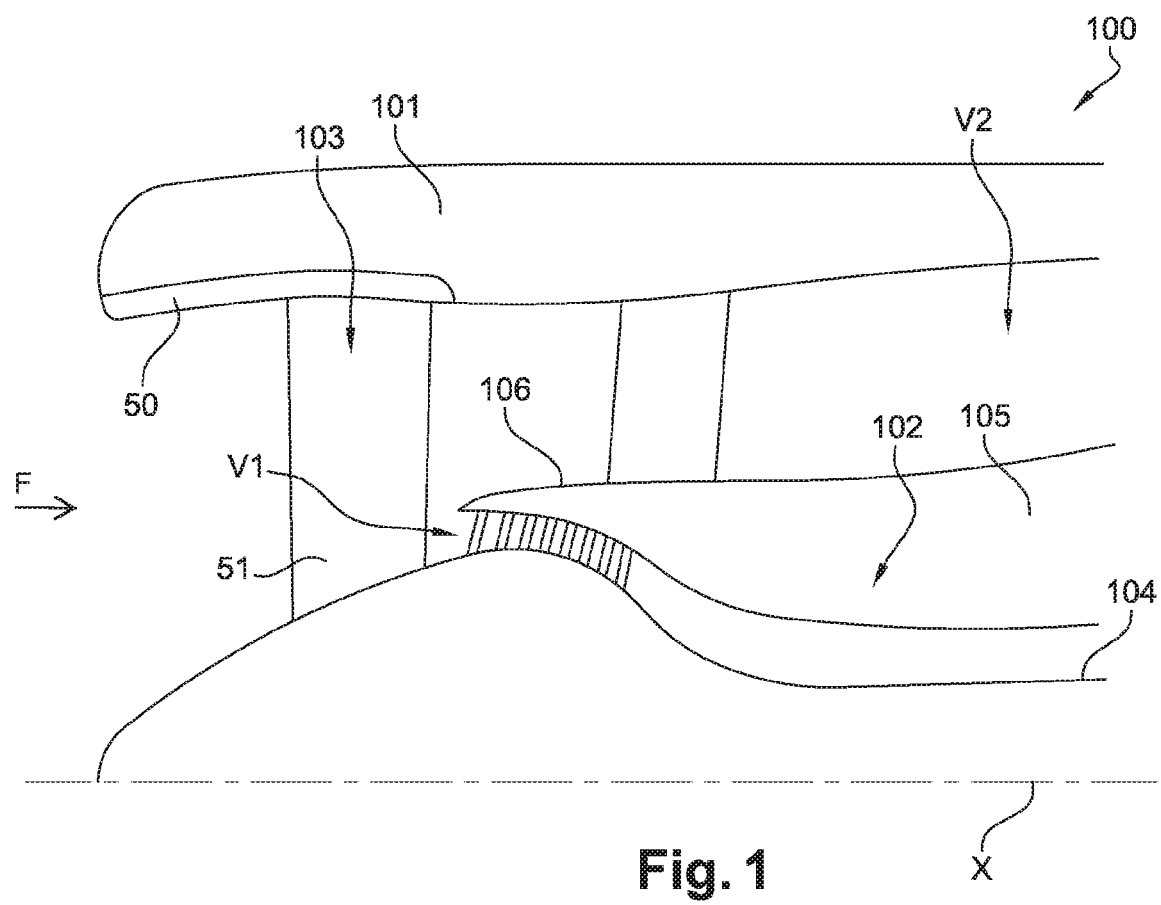
FIG. 1 shows an axial and partial cross-sectional view of an example of a turbomachine to which the invention applies.

FIG. 1 schematically shows a turbomachine of an aircraft according to the invention. In particular, it shows a double flow turbomachine that extends along an axis X. This turbomachine 100 generally comprises an outer casing 101 surrounding a gas generator 102, upstream from which is mounted a fan 103. In the present invention and generally, the terms "upstream" and "downstream" are defined with respect to the circulation of gases in the turbomachine 100. The terms "up" and "down" are defined with respect to a radial axis perpendicular to the axis X.

The gas generator 102 comprises, in this example, from upstream to downstream, a low-pressure compressor, a high-pressure compressor, a combustion chamber, a high-pressure turbine and a low-pressure turbine. The generator is housed in an inner casing 104.

The fan 103 here is ducted and comprises a shroud 50 secured to the outer casing 101 and surrounding a plurality of mobile vanes of the fan 51, which are mounted and extend radially from a fan shaft connected to a drive shaft of the gas generator 102.

The fan 103 compresses the air coming into the turbomachine 100, where it is split into a hot air flow circulating in a primary flowpath V1 which passes through the gas generator, and a cold air flow circulating in a secondary flowpath V2 around the gas generator 102. In particular, the primary flowpath V1 and the secondary flowpath V2 are separated by an annular inter-flowpath casing 105 arranged between the outer casing 101 and the inner casing 104. The flow circulating in the primary flowpath V1 is conventionally compressed by the compressor stages before entering the combustion chamber. The combustion energy is recovered by the turbine stages which ensure the driving of the compressor stages and the fan. The cold air flow F circulating in the secondary flowpath V2 is oriented along an axial direction, substantially parallel to the longitudinal axis X, and itself contributes to providing thrust to the turbomachine 100.

Figure 2:
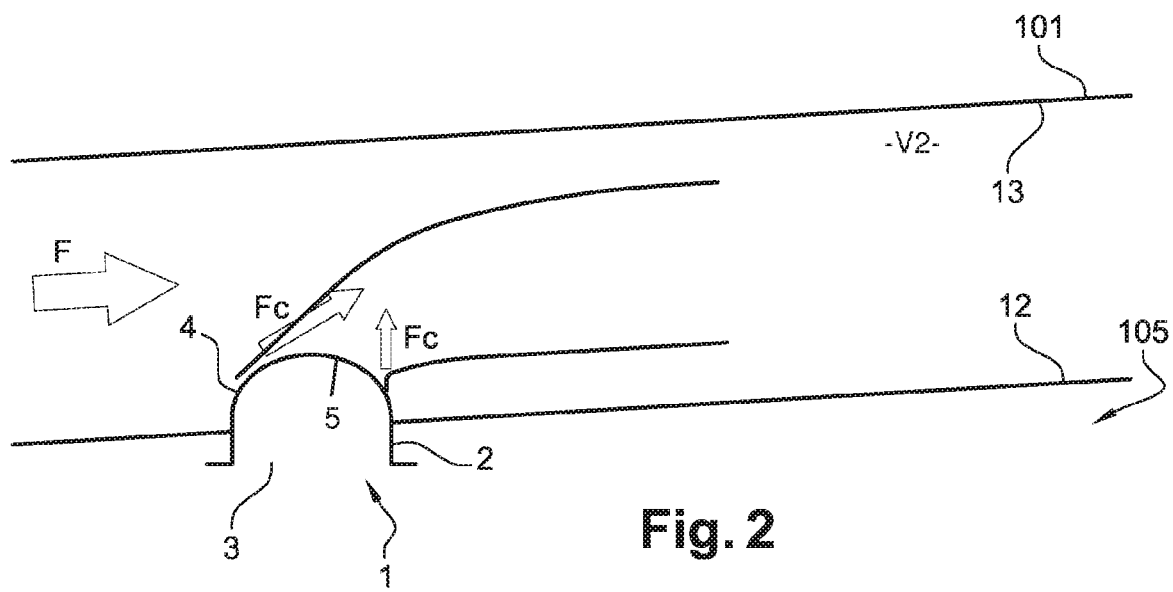
FIG. 2 is a schematic and axial cross-sectional view of a flowpath, wherein is positioned a flow deflector according to the invention.
Figure 3:
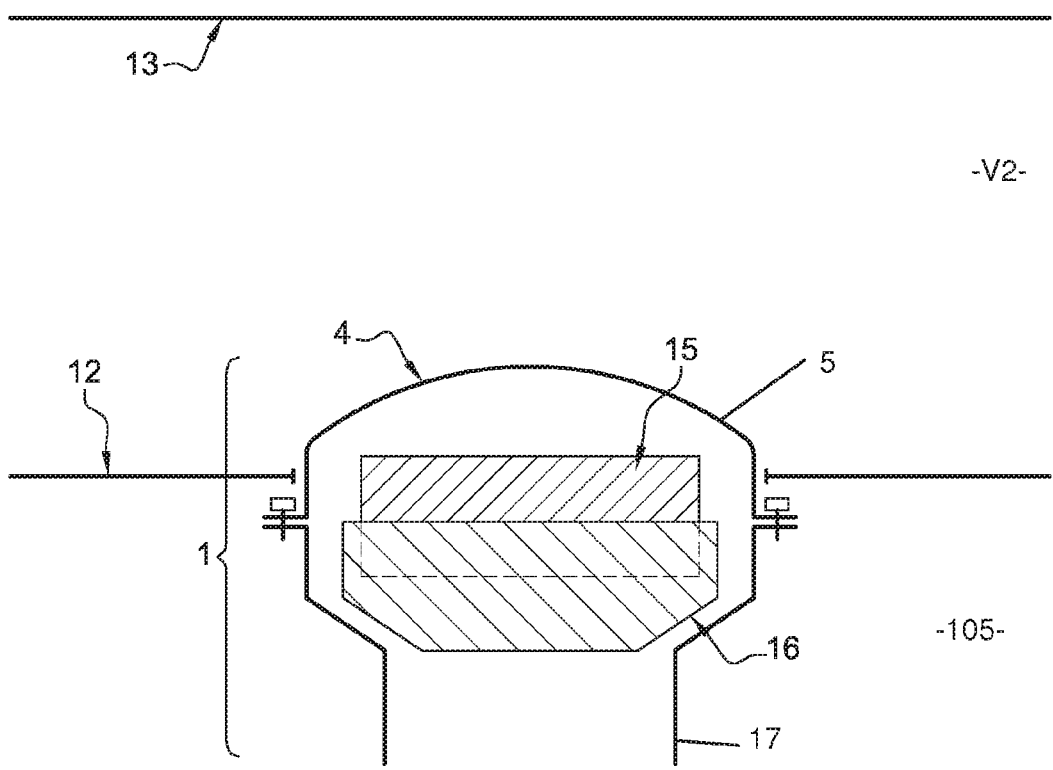
FIG. 3 shows a discharge valve system comprising a regulation device and an actuator acting on the regulation device.

In reference to FIGS. 2 and 3, a discharge valve system 1 is arranged between the primary flowpath V1 and the secondary flowpath V2 of the turbomachine 100. The discharge valve system 1 is mounted on a wall 12 of the inter-flowpath casing 105 and right side up the high-pressure compressor. Therefore, the hot air collected for discharging the high-pressure compressor is ejected into the secondary flowpath V2. The discharge valve system 1 comprises a flow deflector 4, an air regulation device 16, an actuator 15 acting on the regulation device 16 and a duct 17.

Figure 6:
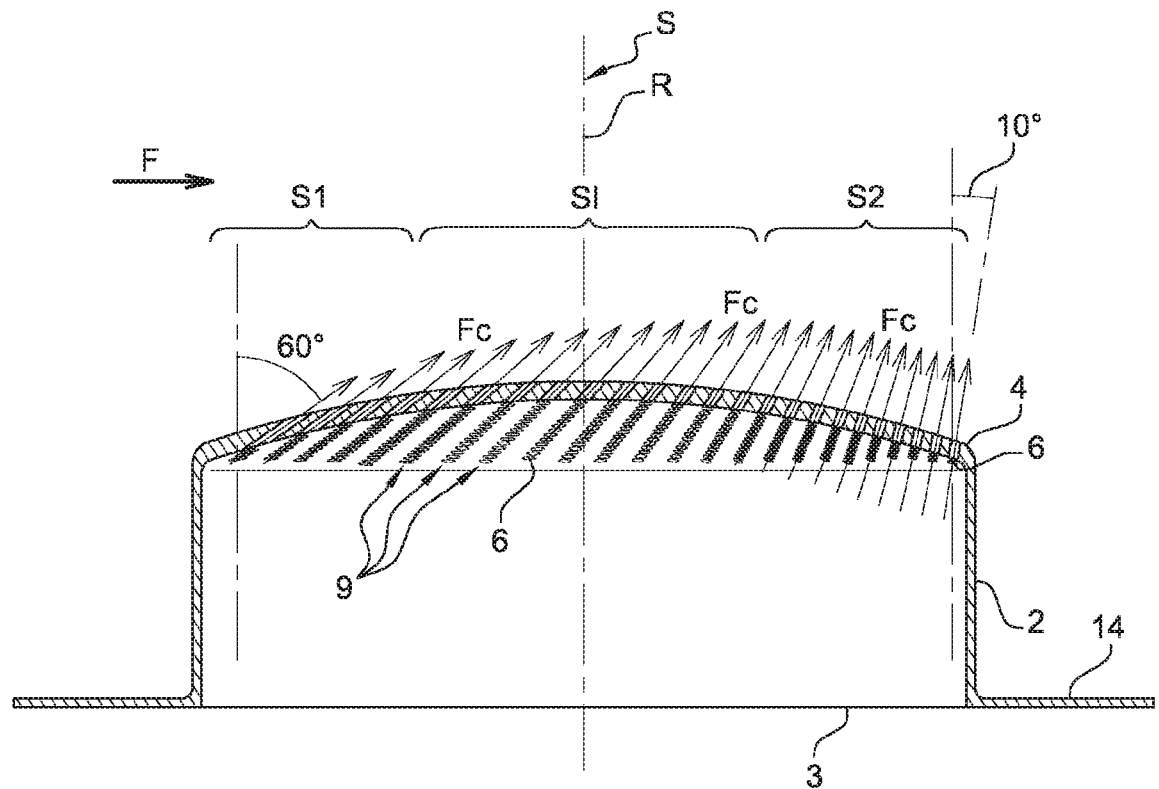
FIG. 6 is a schematic and cross-sectional view of the flow deflector shown in FIG. 5.

The flow deflector 4 comprises a body 2 coupled to an air inlet 3 and extending from a wall 5. The body 2 has a generally cylindrical shape with a circular section and a revolution axis R (FIG. 6). The flow deflector 4 comprises a collar 14 secured to the body 2 and surrounding the air inlet 3. This collar 14 makes it possible to secure the flow deflector 4 to the duct 17 in the inter-flowpath casing 105. The flow deflector 4 is intended to be arranged in the secondary flowpath V2 such that the hot air flow received from the compressor through the air inlet 3 is ejected directly into the secondary flowpath V2 through ejection channels. The ejection channels are situated in the secondary flowpath. The body 2 defines a passage for the air flow between the air inlet 3 and the ejection channels.

The flow deflector 4 is connected to the duct 17 that extends through the inter-flowpath casing 105. For this, the collar 14 comprises holes passing through the wall of the latter, on either side thereof. The holes are intended to receive removable attachment means, such as screws. The duct 17 comprises a hot air inlet (not shown) intended to fluidly communicate with the primary flowpath V1 and to receive a portion of the hot flow coming from the high-pressure compressor. The duct 17 also comprises a hot air outlet coupled to the air inlet 3 of the flow deflector 4. The duct 17 makes it possible for the passage of the hot air flow from the compressor towards the flow deflector 4.

The regulation device 16 and the actuator 15 are arranged inside the duct 17. The device 16 makes it possible to regulate the hot air discharge air flow coming from the compressor. The device 16 comprises a needle valve movable along a radial axis substantially perpendicular to the axis X. The needle valve moves from a first position wherein the hot air coming from the compressor does not circulate from the hot air inlet of the duct 17 towards the flow deflector and a second position wherein the hot air coming from the compressor circulates from the hot air inlet of the duct 17 towards the flow deflector. The first position corresponds to a position wherein the hot air inlet of the compressor is closed and the second position corresponds to a position wherein the hot air inlet is open. The movement of the needle valve is controlled by the actuator 15. In particular, when it is necessary to discharge hot air from the compressor into the secondary flowpath V2, the actuator 15 causes the upwards movement of the needle valve in order to open the hot air inlet. The flow of hot air coming from the compressor thus travels through the duct 17 towards the flow deflector 4. A discharge air flow Fc is then discharged in the flowpath V2 through the ejection channels described below.

In reference to FIGS. 4 to 7, the flow deflector comprises a wall 5 provided with a plurality of ejection channels 6 capable of discharging the hot air flow coming from the compressor into the secondary flowpath V2, wherein circulates the cold air flow F. The ejection channels 6 are configured to eject a discharge air flow Fc that does not come into direct contact with the walls 12, 13 of the secondary flowpath V2 and does not disrupt the flow and circulation of the cold air flow. In other words, the discharge air flow Fc is not ejected so as to counter the direction of air flow coming from the fan. The wall 5 of the deflector has an arched shape. The thickness thereof is constant. The wall has a constant thickness of between 1 and 5 mm. In particular, the wall has a first concave internal surface 7 rotated towards the regulation device 16 of the discharge valve system 1 and a second convex external surface 8 opposite the first internal surface and rotated towards the secondary flowpath V2. The wall 5 here has a spherical shape. It has a circular peripheral edge. Of course, the peripheral edge of the wall, and the wall itself, can be of another shape, such as a rectangular shape.

Figure 7:
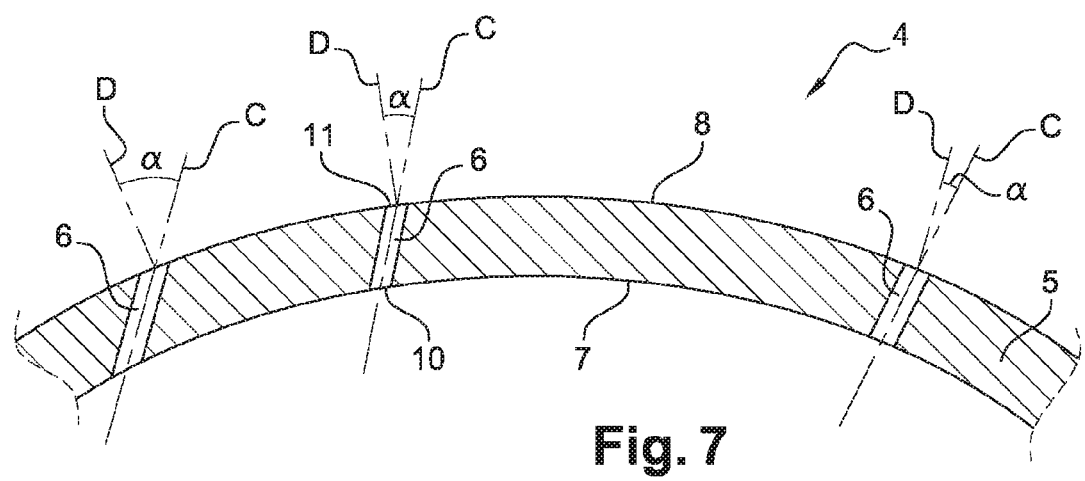
FIG. 7 is a cross-sectional and detailed view of a wall of the flow deflector according to the invention.

In reference to FIG. 7, the ejection channels 6 are formed in the wall 5 and extend on either side of the latter between the first surface 7 and the second surface 8. The ejection channels 6 have, here, a constant circular section about a central axis C. The diameters of the ejection channels distributed on the wall 5 are here also identical. In the examples shown, the ejection channels 6 occupy almost all of the surface of the wall 5. Each ejection channel 6 has an inlet orifice 10 defined in the first surface 7 and fluidly communicating with the passage of the body 2 and an outlet orifice 11 defined in the second surface 8 and fluidly communicating with the secondary flowpath V2.

Each ejection channel 6 is oriented at an angle α defined between the central axis C and a normal line D to the wall 5 of the deflector.

According to one characteristic of the invention, the angles of the ejection channels 6 vary by decreasing between an upstream edge and a downstream edge of the wall defined along the direction of movement of the air flow of the fan.

Each angle α is between 10° and 60°.

Figure 4:
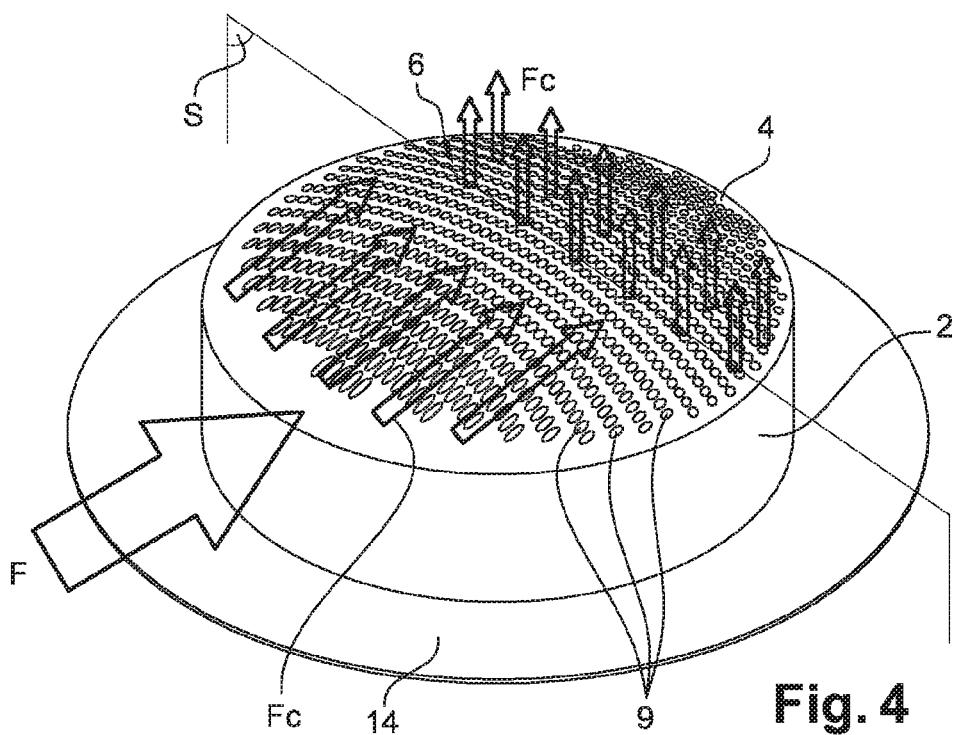
FIG. 4 is a perspective view of an example of a flow deflector according to the invention.
Figure 5:
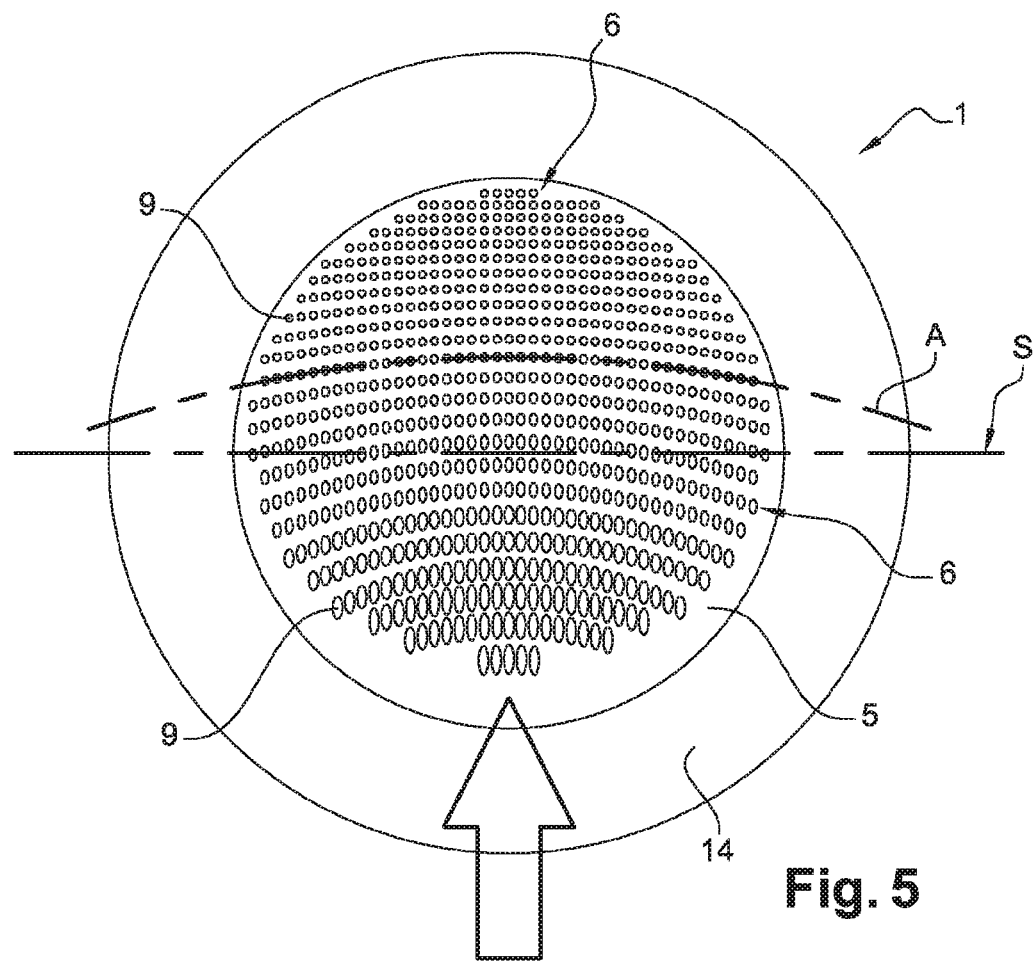
FIG. 5 is a top view of the flow deflector shown in FIG. 4.

In an advantageous but non-limiting manner, the ejection channels 6 are arranged in several rows 9 along aligned directions A (see FIG. 5). The rounded shape of the aligned direction seen in FIGS. 4 and 5 is due to the spherical shape of the wall 5. The aligned directions are substantially parallel to an axial plane S of the wall 5 intersecting with the revolution axis R of the body. This axial plane S is substantially perpendicular to the direction of the movement of the fan air flow. The number of rows 9 of ejection channels is between 20 and 30. In the example shown, the wall 5 of the flow deflector 4 comprises 24 rows of ejection channels, each forming a discharge flow blade. Each row 9 comprises between 4 and 50 ejection channels 6. It is understood, that the number of rows and the number of ejection channels per row depends on the dimensions of the flow deflector, on the dimensions of the ejection channels and on the required flow through the diffuser when the valve is open.

According to one characteristic of the invention, the ejection channels of each row are oriented at the same angle α so as to form a discharge air flow blade Fc. As is shown in FIG. 7, the angle of the rows of ejection channels 6 varies between 65° and 5° from upstream to downstream with respect to the direction of movement of the air flow F, when the discharge valve system 1 is installed in the turbomachine 100. In particular, this variation is defined between an upstream edge and a downstream edge of the wall 5 with respect to the axial plane S. Therefore, the discharge air flow Fc blades passing through the ejection channels 6 are guided along a direction oriented in the direction of cold flow circulation in the upstream section and along a direction that is substantially transversal with respect to the direction of cold flow circulation in the downstream section. At least one row located in the proximity of the upstream edge is provided with channels oriented such that the discharge flow Fc is substantially flush with and tangential to the wall of the deflector according to the direction of movement of the air flow (F) of the fan. Likewise, at least one row located in the proximity of the downstream edge is provided with channels oriented such that the discharge flow is substantially parallel to the central axis R of the deflector.

In reference to FIG. 6, the rows 9 comprise a first series S1 of rows positioned upstream, and of which the angles of the channels of two consecutive rows are identical. In this example, the first series S1 is arranged upstream from the axial plane S, wherein the rows 9 are oriented at the same angle. In an advantageous but non-limiting manner, the angle of the ejection channels of this first series S1 is of 60°, such that the blades of the discharge air flow Fc are substantially tangential to the wall 5 of the deflector and do not disrupt the circulation of the cold air flow F. Moreover, the fact that the flows are tangential to the wall of the deflector prevent them from coming into direct contact with the walls of the secondary flowpath, and in particular, the inner wall 13 of the outer casing 101. Downstream from this first series S1 of rows, a second series S2 of rows is provided, wherein the angle of the channels of at least one row 9 is oriented at an angle α between 5° and 15°, such that the flow is substantially vertical, to avoid burning the walls of the secondary flowpath, and in particular the inner wall 12 of the inter-flowpath casing 105. In this example, the angle of the channels of this second series S2 is 10°. An intermediate series SI of rows is arranged between the first series of rows S1 and the second series of rows S2. In this intermediate series SI of rows, the orientation angle α of the channels of the rows varies at each consecutive row by between 3° and 8°. In other words, two consecutive rows of ejection channels have angles that vary by 3° to 8°.

Each series has a given number of rows 9. In a preferred but non-limiting manner, the first and second series S1, S2 comprise a substantially identical number of rows 9. The intermediate series SI comprises twice as many rows 9 as either of the first and second series. In other words, the number of rows of the intermediate series is greater than the number of rows of the first series. Similarly, the number of rows of the intermediate series is greater than the number of rows of the second series. This enables a linear progression of the discharge of the discharge air flow into the discharge passage.

Thus, when the discharge air flow is ejected into the secondary flowpath V2, it is oriented along several blades, of which a first series of discharge air flow blades is substantially tangential to the wall 5 of the flow deflector, an intermediate series of discharge air flow blades and a second series of discharge air flow blades that are substantially vertical. The first series of air flow blades circulating in the centre of the passage substantially axially and coming into contact with the second series of blades changes the vertical direction of the air flow blades of the second series such that they also circulate in the centre of the flowpath V2 and at a distance of the walls 12, 13. The cold air circulation and flow F is not disrupted.

The invention claimed is:

1. A flow deflector of a discharge valve system of a compressor of a double flow turbomachine, the flow deflector being arranged at least in part in a flowpath of the turbomachine in which circulates a fan air flow and comprising a wall provided with a plurality of ejection channels positioned to discharge a discharge air flow from the compressor in the flowpath of the turbomachine, the ejection channels being arranged in rows along aligned directions that are substantially parallel to an axial plane of the deflector, each ejection channel of each row being oriented at an angle defined between each normal line to the wall and axes of each ejection channel, wherein the angle of the ejection channels vary by decreasing from an upstream edge to a downstream edge of the wall defined along a direction of movement of the fan air flow and wherein at least the ejection channels of at least one row situated in a proximity of the upstream edge are oriented such that a discharge flow is substantially flush with the wall of the deflector and along the direction of movement of the fan air flow.

2. The flow deflector according to claim 1, wherein at least one row of the ejection channels located in a proximity of the downstream edge is provided with channels oriented such that the discharge flow is substantially parallel to a central axis of the deflector.

3. The flow deflector according to claim 1, wherein the angle of the channels varies from 65° to 5° between the upstream edge and the downstream edge.

4. The flow deflector according to claim 1, wherein the ejection channels of each row are oriented at the same angle.

5. The flow deflector according to claim 1, wherein each ejection channel has a constant circular section.

6. The flow deflector according to claim 1, wherein the wall has a part-spherical shape.

7. The flow deflector according to claim 1, wherein a number of rows of ejection channels is between 20 and 30.

8. The flow deflector according to claim 1, wherein the wall of the flow deflector comprises at least one first series of rows positioned upstream and of which the channel angles of two consecutive rows are identical and are between 55° and 65°, and a second series of rows positioned downstream and comprising at least one row of channels, the angles of which are between 5° and 15°.

9. The flow deflector according to claim 8, wherein the wall comprises an intermediate series of rows between the first series and the second series, wherein angles of the channels of the rows of the intermediate series vary by an identical value between each row.

10. The flow deflector according to claim 9, wherein a variation of the angles of the channels of the rows of the intermediate series is between 3° and 8°.

11. The discharge valve system of the double flow turbomachine, the system comprising:
the flow deflector according to claim 1;
a duct connected to the flow deflector and comprising a hot air inlet;
a regulation device configured to regulate the passage of the discharge air flow between the hot air inlet of the duct and the flow deflector; and
an actuator acting on the regulation device, such that the regulation device occupies at least one first position wherein the hot air inlet is closed and one second position wherein the hot air inlet is open.

12. The double flow turbomachine comprising a primary flowpath circulating a hot air flow and a secondary flowpath circulating a cold fan air flow, the primary and secondary flowpaths being separated by an inter-flowpath casing wherein, in the inter-flowpath casing, at least one discharge valve system according to claim 11 is arranged.

* * * * *